United States Patent [19]
König

[11] Patent Number: 5,153,970
[45] Date of Patent: Oct. 13, 1992

[54] MECHANISM FOR OPERATING A NEEDLE BOARD IN A NEEDLING MACHINE

[75] Inventor: Franz König, Linz, Austria

[73] Assignee: Textilmaschinenfabrik Dr. Ernst Fehrer Aktiengesellschaft, Leonding, Austria

[21] Appl. No.: 642,019

[22] Filed: Jan. 16, 1991

[30] Foreign Application Priority Data

Jan. 18, 1990 [AT] Austria .................. A100/90

[51] Int. Cl.⁵ .............................. D04H 18/00
[52] U.S. Cl. .................................... 28/107
[58] Field of Search ............. 28/107, 108, 110, 111, 28/113, 114, 115; 112/80.4, 80.42

[56] References Cited

U.S. PATENT DOCUMENTS

| | | | |
|---|---|---|---|
| 1,853,961 | 4/1932 | Curioni | 28/114 |
| 1,934,649 | 11/1933 | Walsh | 28/114 |
| 2,148,511 | 2/1939 | Specht et al. | 28/113 |
| 3,368,256 | 2/1968 | Fehrer et al. | 28/107 |
| 3,877,121 | 4/1975 | Obenaus | 28/115 |
| 4,384,393 | 5/1983 | Asselin | 28/107 |
| 4,884,324 | 12/1989 | Stanislaw | 28/107 |
| 4,977,653 | 12/1990 | Pum | 28/111 |

FOREIGN PATENT DOCUMENTS 256491 8/1967 Austria .

Primary Examiner—Werner H. Schroeder
Assistant Examiner—Amy Brooke Vanatta
Attorney, Agent, or Firm—Collard & Roe

[57] ABSTRACT

A mechanism for operating a needle board in a needling machine comprises two reciprocable rods which serve to operate the board and each of which, together with the associated eccentric drive, is mounted in a bearing housing. To permit an adaptation of the rod spacing to a desired board length, the two bearing housings are rigidly interconnected by at least one spacer to form a flexurally stiff structure.

8 Claims, 1 Drawing Sheet

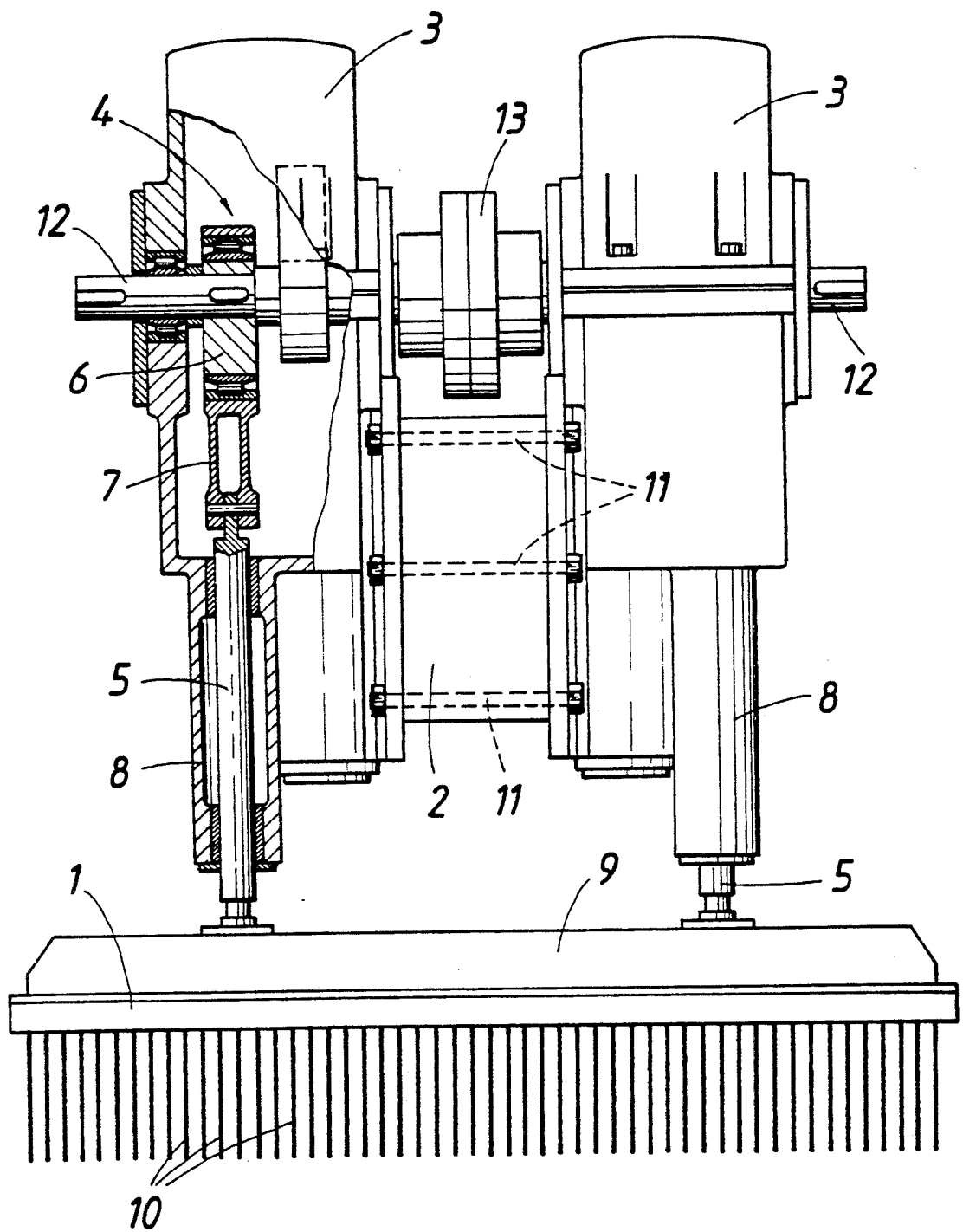

MECHANISM FOR OPERATING A NEEDLE BOARD IN A NEEDLING MACHINE

BACKGROUND OF THE INVENTION

1. Field of the Invention

This invention relates to a mechanism for operating a needle board in a needling machine, comprising a needle beam for supporting the needle board, two reciprocatory rods connected to the needle beam, two eccentric drives for driving the reciprocatory rods and two bearing housings movably mounting the two eccentric drives, respectively, which bearing housings serve to guide the reciprocatory rods.

2. Description of the Prior Art

To permit the use of larger working widths for the needling of nonwoven webs it is conventional (Austrian Patent Specification 256,491) to provide the needle board means by which the working width is determined as a modular assembly of a plurality of needle boards, and to operate each needle board by two reciprocatory rods connected each to an eccentric drive so that each needle board has associated with it a drive mechanism in which the guides for the two reciprocatory rods and the associated eccentric drives are provided in a common bearing housing, which together with the bearing housings for the remaining needle boards of the needle beam is secured to a carrier, which extends throughout the length of the set of boards. Because the eccentric shafts of each drive mechanism are connected by a flexible coupling, vibration will be restricted to each drive mechanism so that the set of needle boards can be reciprocated at high frequencies even if the working width is large. But said known drive mechanisms have the disadvantage that the common bearing housing for the two reciprocable rods and the associated eccentric drives determine a certain spacing of the lifting rods and thus oppose an adaptation of the lifting rod spacing to a desired length of the needle board. In that connection it must be borne in mind that a deflection of the needle beam which supports the needle board will result in a variation of the depth of penetration of the needles into the nonwoven web across the length of the needle beam so that the nonwoven web will not be regularly needled. For this reason the deflection of the needle beam must be kept within very close limits and this gives rise to the requirement that the rod spacing must be adapted to the length of the needle board, so that a rod spacing will permit the working width to be selected only in certain steps.

If the reciprocatory rods and the associated eccentric drives are not mounted in common bearing housings and each reciprocatory rod and the associated eccentric drive are accommodated in a separate housing, it will no longer be possible to benefit from the advantages afforded by the provision of a common housing particularly as regards the taking up of vibration. On the other hand, drive mechanisms provided with two separate housings for respective rod drives will permit an adaptation of the rod spacing to the length of the needle beam. The resulting vibration problems will have the result that needling machines provided with such drive mechanisms can be reciprocated only at a relatively low frequency.

SUMMARY OF THE INVENTION

For this reason it is an object of the invention to provide a mechanism for operating a needle board which permits an adaptation of the rod spacing to the length of the board whereas the advantages afforded by a common bearing housing as regards the taking up of vibration will be retained.

In an operating mechanism which is of the kind described first hereinbefore the object set forth is accomplished in accordance with the invention in that the two bearing housings are rigidly interconnected by at least one spacer to form a stiff structure resistant to bending.

Because the two bearing housings for accommodating respective rod mechanisms are rigidly interconnected by a spacer, the same result regarding the taking up and confining of vibration will be achieved as where a common housing is provided because the rigid connection between the two bearing housings results in the provision of a flexurally stiff structure, which will determine the confining of vibration. The spacer between the two bearing housings will ensure that the rod spacing has the desired magnitude whereas the vibrational behavior of the mechanism will not adversely be affected and the desirable modular system will not be abandoned, which requires the use of identical components such as are provided by the bearing housings and the rod mechanisms.

The distance between the eccentric shafts of the two rod mechanisms is determined by the length of the spacer and can be bridged in a simple manner by the provision of a suitable coupling bridging that distance. That coupling may also correct angular deviations.

The design of the spacer may vary greatly because it is sufficient to provide a rigid connection between the bearing housings which are spaced a predetermined distance apart. In the simplest case the spacer may consist of an interposed member having a suitable length. If the spacer is composed of a plurality of sections it will be possible to change the length of the spacer simply by suitably selecting the sections. Alternatively, the spacer can be adjustable in length. In that case it will be necessary to provide two members, which are slidable relative to each other and which must be non-displaceably connected to each other in their adjusted position and which are preferably provided with dovetail or round-section guides.

Alternatively, the spacer may be constituted by an extension of at least one bearing housing. In that case the spacers usually consist of cast extensions and may be manufactured as standard for the largest rod spacing which may be desired and the spacer can then be cut to the length which is required for a given application. To ensure a symmetrical arrangement the housing extensions may desirably provided on both bearing housings.

To ensure that the two bearing housings and the spacer constitute a stiff structure resistant to bending, said bearing housings must be interconnected by means which will take up all loads. In that connection particularly desirable structures will be obtained if the two bearing housings are rigidly interconnected by tie rods, by which the spacer between the two bearing housings is held under a suitable initial stress.

BRIEF DESCRIPTION OF THE DRAWING

The drawing shows an illustrative embodiment of the invention which is a simplified front elevation showing a mechanism for operating a needle board in a needling machine with parts partly broken away.

DETAILED DESCRIPTION OF THE PREFERRED EMBODIMENTS

The illustrated operating mechanism may be combined with similar operating mechanisms to provide means for operating a transverse row of needle boards 1. The operating mechanism essentially consists of two bearing housings 3, which are rigidly interconnected by a spacer 2 and are associated with respective eccentric drives 4 and rods 5 driven by the eccentric drives 4, each reciprocatory rod 5 being pivoted in the conventional manner to a connecting rod 7, which is movably mounted on the eccentric 6 of the eccentric drive 4. Each rod 5 is axially slidably held in a rod track 8 of the housing 3. The two reciprocatory rods 5 carry a needle beam 9, by which the needle board 1 is supported, whose needles 10 pierce into the nonwoven web which is to be needled.

In the illustrated embodiment the spacer 2 consists of at least one member which is interposed between the two bearing housings 3, which are rigidly interconnected by tie rods 11 so that the interposed spacer is under a corresponding initial stress to constitute together with the spacer 2 a stiff structure resistant to bending, which particularly regarding the taking up and confining of vibration affords the same advantages as a housing which is common to both operating mechanisms, whereas the distance between the two reciprocable rods 5 can still be adjusted. Because the distance between the two reciprocable rods 5 is determined by the length of the spacer 2 between the two bearing housings 3, the rod spacer can be adjusted by an adjustment of the length of that spacer, e.g., by replacing the spacer member by another. Alternatively, the length of the spacer can be adjusted by an addition of one or more sections. Spacers which are adjustable in length may also be used for that purpose if such spacers will ensure that the two bearing housings 3 are rigidly connected to form a stiff structure resistant to bending.

The distance between the bearing housing 3 is adapted to the desired rod spacing and is determined by the spacer 2. That distance can be bridged adjacent to the two eccentric shafts 12 of the eccentric drives 4 by a suitable coupling 13, which connects the shafts 12 and is required to transmit only torques.

Because the rod spacing can be adapted to the length of the needle beam 9 of needle board 1 employed in a given case, it is possible to provide a working width which meets the requirements and to select the board length in consideration of the frequencies of the reciprocating motion whereas the modular system including identical bearing housings and operating mechanisms can be retained. For instance, short needle beams which are comparatively light in weight may be reciprocated at high frequencies whereas longer needle beams may be selected for needling machines which reciprocate at lower frequencies.

What is claimed is:

1. In a mechanism for operating a needle board in a needling machine, comprising
    a needle beam for supporting a needle board;
    two laterally spaced apart reciprocatory rods connected to said needle beam; and
    two eccentric drives connected to said rods and operable to reciprocate said rods,
    the improvement comprising
    two bearing housings, in which respective ones of said eccentric drives and respective ones of said rods are mounted, and
    spacer means rigidly interconnecting the two bearing housings to form a stiff structure resistant to bending.

2. The improvement set forth in claim 1, wherein
    each of said eccentric drives comprises an eccentric shaft and
    said eccentric shafts are operatively interconnected by a coupling, which bridges the length of said spacer means.

3. The improvement set forth in claim 1, wherein said spacer means consists of a single spacer member.

4. The improvement set forth in claim 3, wherein said spacer member is adjustable in length.

5. The improvement set forth in claim 1, wherein said spacer means comprises an assembly consisting of a plurality of sections.

6. The improvement set forth in claim 1, wherein said spacer means is adjustable in length.

7. The improvement set forth in claim 1, wherein said spacer means is an integral extension of at least one of said bearing housings.

8. The improvement of claim 1, further comprising tie means rigidly interconnecting the two bearing housings and holding said spacer means under stress.

* * * * *